US010970890B2

(12) United States Patent
Wei et al.

(10) Patent No.: US 10,970,890 B2
(45) Date of Patent: Apr. 6, 2021

(54) MAZE SOLVING METHOD BASED ON LINE-SURFACE SPATIAL RELATION

(71) Applicant: GUANGXI HUIGUIXIAN INFORMATION TECHNOLOGY CO., LTD., Guangxi (CN)

(72) Inventors: Jinzhan Wei, Qinzhou (CN); Minghui Chen, Dongguan (CN); Yuanlin Huang, Qinzhou (CN); Sheng Wang, Nanning (CN); Yiming Li, Nanning (CN); Xin Wei, Nanning (CN); Kai Deng, Qinzhou (CN); Jin Tao, Qinzhou (CN); Weirong Qin, Qinzhou (CN)

(73) Assignee: GUANGXI HUIGUIXIAN INFORMATION TECHNOLOGY CO., LTD., Guangxi (CN)

(*) Notice: Subject to any disclaimer, the term of this patent is extended or adjusted under 35 U.S.C. 154(b) by 0 days.

(21) Appl. No.: 16/475,943

(22) PCT Filed: Mar. 6, 2018

(86) PCT No.: PCT/CN2018/078129
§ 371 (c)(1),
(2) Date: Jul. 3, 2019

(87) PCT Pub. No.: WO2018/233318
PCT Pub. Date: Dec. 27, 2018

(65) Prior Publication Data
US 2019/0347835 A1 Nov. 14, 2019

(30) Foreign Application Priority Data

Jun. 19, 2017 (CN) .......................... 201710462640.8

(51) Int. Cl.
*G06T 11/20* (2006.01)
*G06F 16/583* (2019.01)
(Continued)

(52) U.S. Cl.
CPC ............ *G06T 11/203* (2013.01); *G06F 16/56* (2019.01); *G06F 16/587* (2019.01); *G06F 16/5854* (2019.01); *G06T 7/60* (2013.01)

(58) Field of Classification Search
None
See application file for complete search history.

(56) References Cited

U.S. PATENT DOCUMENTS 6,545,288 B1 * 4/2003 Ratchkov .............. G06F 30/394
257/12

FOREIGN PATENT DOCUMENTS

| CN | 103116356 A | 5/2013 |
| CN | 104731099 A | 6/2015 |
| CN | 107480804 A | 12/2017 |

OTHER PUBLICATIONS

Aki et al., "Obtaining Path Data From Maze Image Using Image Processing Techniques", International Scientific Conference, Nov. 18-19, 2016, Gabrovo, total of 4 pages.
(Continued)

*Primary Examiner* — Vu Nguyen
(74) *Attorney, Agent, or Firm* — Birch, Stewart, Kolasch & Birch, LLP

(57) ABSTRACT

A maze-solving method includes converting extracted channel surface-shaped data into channel boundary lines; extending extension lines from two end points at a start point and at a terminal point, to two sides outside a maze, and constructing, outside the maze, a virtual connection line I and a virtual connection line II connecting base points on the extension lines of the start point and the terminal point; respectively enclosing a polygon I and a polygon II by means of the virtual connection line I and the channel boundary lines and by means of the virtual connection line II and the channel boundary lines, in which paths connecting the start point and the terminal point, between the polygon
(Continued)

I and the polygon II are alternative solution paths for the maze; and selecting an alternative solution path with the shortest length as the optimal solution path for the maze.

3 Claims, 5 Drawing Sheets

(51) Int. Cl.
    *G06F 16/587*     (2019.01)
    *G06F 16/56*     (2019.01)
    *G06T 7/60*     (2017.01)

(56)     References Cited

OTHER PUBLICATIONS

International Search Report for PCT/CN2018/078129 (PCT/ISA/210) dated May 30, 2018.

\* cited by examiner

MAZE SOLVING METHOD BASED ON LINE-SURFACE SPATIAL RELATION

FIELD OF THE INVENTION

The present invention relates to the field of computer graphics and geographic information science, and particularly relates to a maze solving method based on a line-surface spatial relation.

BACKGROUND OF THE INVENTION

Maze path solution has been a research hotspot in mathematics and computer graphics since ancient times, but the traditional maze path solutions are mostly from the perspective of the graph theory and mathematics, and their search efficiency and accuracy are not satisfactory. Especially when the complexity of the maze reaches a certain level, the computers and the traditional algorithms are powerless.

The maze solving involves a path search problem in an obstacle environment, so the traditional path search method is suitable for the maze path solution. However, in view of the particularity of the maze solving, such as automatic filtering in a dead end environment is not considered, few scholars have used the traditional path search method for the maze path solution; meanwhile, the traditional maze algorithm usually uses a maze path midline for solving. However, when the complexity of the maze is high, a huge amount of computation is caused by the extraction of the path midline, so that the maze solving efficiency is greatly reduced.

SUMMARY OF THE INVENTION

The present invention aims at providing a maze solving method based on a line-surface spatial relation, which is mainly realized by a channel data line and a spatial topological relation, and the technical solution thereof is as follows:

The maze solving method based on the line-surface spatial relation includes the following steps:

A. converting a maze picture into vector data by raster to vector conversion, and extracting channel surface-shaped data;

B. converting the channel surface-shaped data into channel boundary lines, and removing the channel boundary lines at the start point and the terminal point, so that the channels at the start point and the terminal point are open;

C. respectively extending extension lines from the two endpoints of the start point along the two outer sides of the maze, wherein a base point X1 and a base point X2 are respectively provided on the extension lines of the start point; respectively extending extension lines from the two endpoints of the terminal point along the two outer sides of the maze, wherein a base point Y1 and a base point Y2 are respectively provided on the extension lines of the terminal point; at the outside of the maze, constructing a line which connects the base point X1 and the base point Y1 to obtain a virtual connecting line I, and constructing a line which connects the base point X2 and the base point Y2 to obtain a virtual connecting line II, wherein the virtual connecting line I and the virtual connecting line II have no cross point;

D. using the portion surrounded by the virtual connecting line I and the channel boundary lines of the maze as a polygon I, and using the portion surrounded by the virtual connecting line II and the channel boundary lines of the maze as a polygon II; the path connecting the start point and the terminal point between the polygon I and the polygon II is an alternative solution path of the maze; and E. performing path length analysis on the obtained alternative solution path of the maze, and using the path with the shortest length as the optimal solution path of the maze.

Preferably, the step A includes the following steps:

A1. removing the color in the maze picture to convert the maze picture into a black and white image;

A2. performing raster to vector conversion to convert the black and white image into vector data;

A3. inversely calculating the depth of the black and white color according to a color value;

A4. figuring out channel portions according to the depth of the black and white color; and A5. merging the channel portions to obtain channel surface-shaped data.

The present invention extends the maze path solution to the field of spatial topology analysis, extracts the path channel surface-shaped data of the maze, and figures out the maze path by combining the path channel surface-shaped data of the maze with the line-surface relation; compared with the traditional algorithm, the step of extracting the midline of the maze path is omitted, so that the calculation amount and operation time are greatly reduced; and the present invention further has the characteristics of simple principle, easy implementation, high efficiency and good stability, and meanwhile when the maze path changes, the present invention can be implemented just by fine tuning the channel data of the corresponding portion without performing global search, so that the data processing difficulty, cost and time are greatly reduced, and the present invention has great application potential in both civil and military fields.

Names and sequence numbers of various portions in the figures are as follows:

1. virtual connecting line I, 2. virtual connecting line II, 3. polygon I, 4. polygon II, and 5. alternative solution path.

DETAILED DESCRIPTION OF THE EMBODIMENTS

The present embodiment is illustrated in detail below in combination with embodiments.

Embodiment 1

The embodiment provides a maze solving method based on the line-surface spatial relation, including the following steps:

In the maze path solution process of the embodiment, an operating platform is the Windows 7 operating system on a PC, and a geographic information system platform is the version 5.3.3 of software of the Beijing SuperMap geographic information platform.

Figure 1:
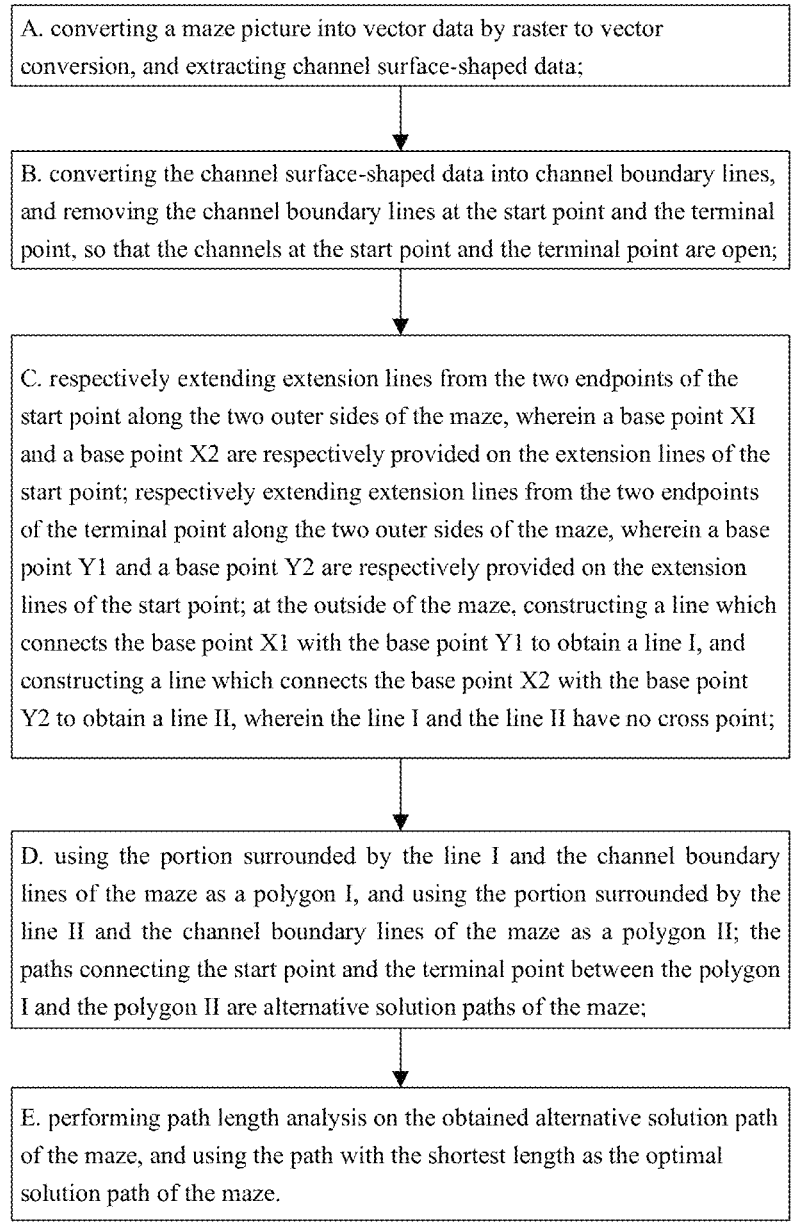
FIG. 1 is a schematic flow chart of a maze solving method based on a line-surface spatial relation in the present invention.
Figure 2:
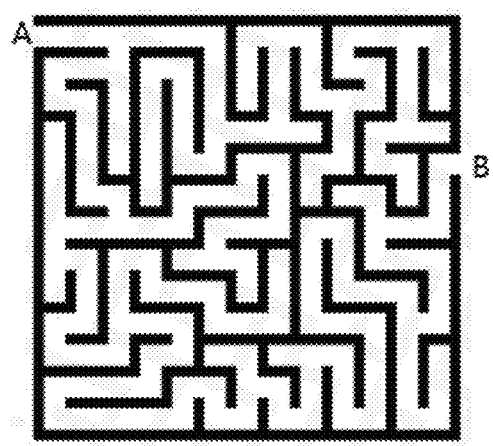
FIG. 2 is a schematic diagram of the maze in embodiment 1 of the present invention.
Figure 3:
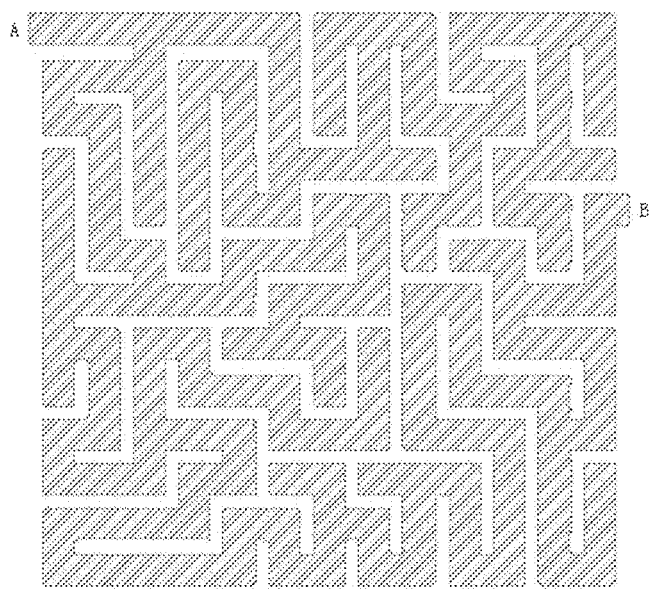
FIG. 3 is a schematic diagram of channel surface-shaped data of embodiment 1 of the present invention.
Figure 4:
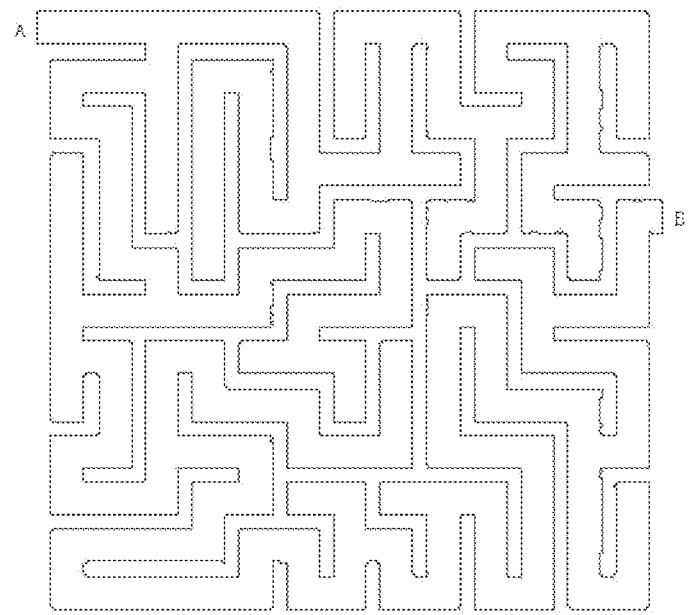
FIG. 4 is a schematic diagram of channel boundary lines (the start point and the terminal point are not open) of embodiment 1 of the present invention.
Figure 5:
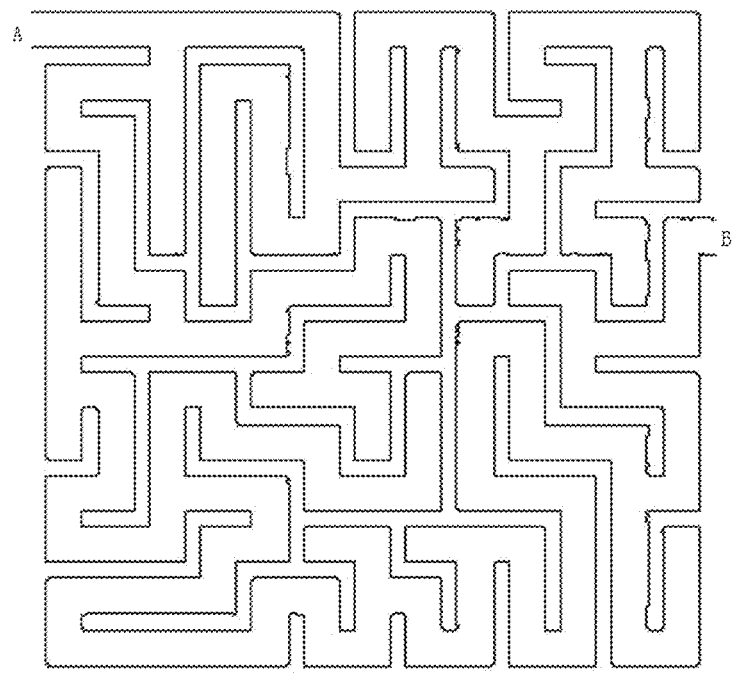
FIG. 5 is a schematic diagram of channel boundary lines (the start point and the terminal point are open) of embodiment 1 of the present invention.
Figure 6:
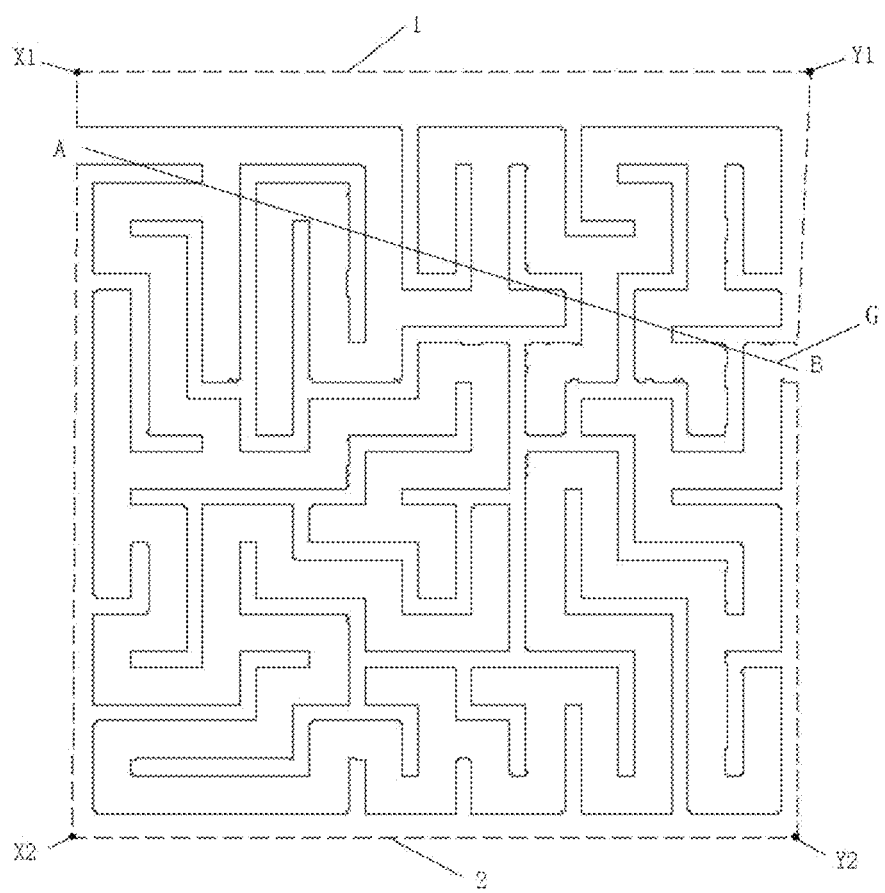
FIG. 6 is a schematic diagram of a polygon I and a polygon II of embodiment 1 of the present invention.
Figure 7:
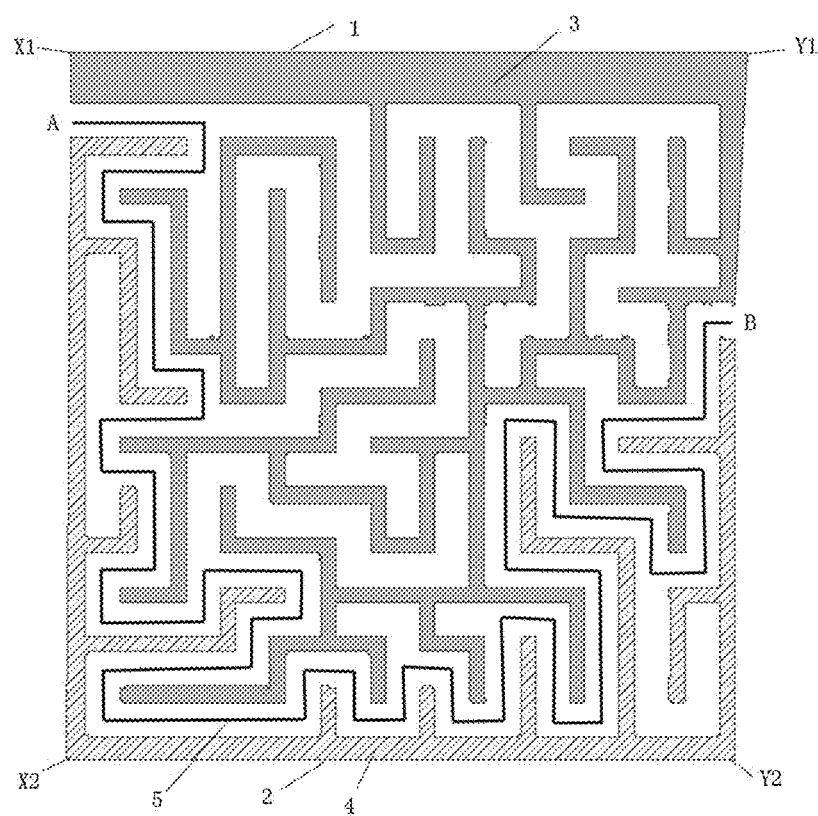
FIG. 7 is a schematic diagram of an optimal solution path of embodiment 1 of the present invention.

As shown in FIG. 1, the maze solving method based on the line-surface spatial relation provided by the embodiment includes the following steps;

A. converting a maze picture into vector data by raster to vector conversion, and extracting channel surface-shaped data, as shown in FIG. 3;

The step A is specifically as follows:

A1. removing the color in the maze picture to convert the maze picture into a black and white image;

A2. performing raster to vector conversion on the Beijing SuperMap geographic information platform to convert the black and white image into surface-shaped vector data;

A3. performing calculation according to a color value through Value=R*256*256+G*256+B, wherein after the picture is converted into the black and white image, R=G=B, and Value=65793R, and inversely calculating depth R of the black and white color;

A4. querying a database of the Beijing SuperMap geographic information platform according to the depth R of the black and white color to obtain the data of the channel portions;

A5. merging the data of the channel portions through the Beijing SuperMap geographic information platform to obtain channel surface-shaped data;

B. converting the channel surface-shaped data into channel boundary lines, as shown in FIG. 4, and removing the channel boundary lines at the start point A and the terminal point B, so that the channels at the start point A and the terminal point B are open, as shown in FIG. 5;

C. respectively extending extension lines from the two endpoints of the start point along the two outer sides of the maze, wherein a base point XI and a base point X2 are respectively located on the extension lines of the start point A; respectively extending extension lines from the two endpoints of the terminal point B along the two outer sides of the maze. wherein a base point Y1 and a base point Y2 are respectively located on the extension lines of the terminal point B; at the outside of the maze, constructing a line which connects the base point XI and the base point Y1 to obtain a virtual connecting line I1, and constructing a line which connects the base point X2 and the base point Y2 to obtain a virtual connecting line II2, wherein the virtual connecting line I and the virtual connecting line II have no cross point, as shown in FIG. 6;

D. using the portion surrounded by the virtual connecting line I and the channel boundary lines of the maze as a polygon I 3, and using the portion surrounded by the virtual connecting line II and the channel boundary lines of the maze as a polygon II 4;

the path connecting the start point A and the terminal point B between the polygon I3 and the polygon II 4 is an alternative solution path 5 of the maze, as shown in FIG. 7; and E. performing path length analysis on the obtained alternative solution path of the maze, and using the path with the shortest length as the optimal solution path of the maze, in the embodiment, there is one alternative solution path of the maze, namely, the path is the optimal solution path of the maze.

The maze solving method based on a line-surface spatial relation comprises the following steps:

A. converting a maze picture into vector data by raster to vector conversion, and extracting channel surface-shaped data;

B. converting the channel surface-shaped data into figures of channel boundary lines, and removing the channel boundary lines at the start point and the terminal point, so that the channels at the start point and the terminal point are open, a channel line start point I and a channel line start point II are formed at the start point, and a channel line terminal point I and a channel line terminal point II are formed at the terminal point;

C. respectively extending extension lines from the channel line start point I and the channel line start point II of the start point along the two outer sides of the maze, wherein a base point XI is provided on the extension line of the channel line start point I, and a base point X2 is provided on the extension line of the channel line start point II; respectively extending extension lines from the channel line terminal point I and the channel line terminal point II of the terminal point along the two outer sides of the maze, wherein a base point Y1 is provided on the extension line of the channel line terminal point I, and a base point Y2 is provided on the extension line of the channel line terminal point II; at the outside of the maze, constructing a line which connects the base point X1 and the base point Y1 to obtain a virtual connecting line I from the channel line start point I to the channel line terminal point I, and constructing a line which connects the base point X2 and the base point Y2 to obtain a virtual connecting line II from the channel line start point II to the channel line terminal point II, wherein the virtual connecting line I has no cross point with the extension line of the channel line start point II or the extension line of the channel line terminal point II, and the virtual connecting line II has no cross point with the extension line of the channel line start point I or the extension line of the channel line terminal point I;

D. constructing a straight line G which passes the start point of the maze and the terminal point of the maze, constructing a virtual connecting line polygon I through the channel boundary lines and the virtual connecting line I, within a range enclosed by the virtual connecting line I and the straight line G;

constructing a virtual connecting line polygon II through the channel boundary lines and the virtual connecting line II, within a range enclosed by the virtual connecting line II and the straight line G;

if both of the virtual connecting line polygon I and the virtual connecting line polygon II fail to be constructed, the maze has no solution, and the solving is ended;

if both of the virtual connecting line polygon I and the virtual connecting line polygon II are successfully constructed, the maze has a solution, and entering step E; and E. comparing paths connecting the start point of the maze and the terminal point of the maze in the virtual connecting line polygon I and/or the virtual connecting line polygon II according to line-surface relation, and selecting the shortest path as the solution of the maze.

The step E comprises the following steps:

E1. merging the virtual connecting line polygons I to obtain a merged polygon I containing the channel line start point I and the channel line terminal point I; merging the virtual connecting line polygons II to obtain a merged polygon II containing the channel line start point II and the channel line terminal point II;

E2. if the edge of merged polygon I and the edge of merged polygon II constitute boundaries lines on two sides of a channel, the boundaries lines are channel boundary lines of the solved maze solution, otherwise, entering the next step;

E3. determining a channel boundary line with a shorter length in the channel boundary lines of the merged polygon I and merged polygon II, which connects the start point and the terminal point and contains neither the virtual connecting line I nor the virtual connecting line II;

E4. according to the same principle in step E3, judging each polygon that the determined channel boundary lines pass to obtain the channel boundary line with a shorter distance between the two endpoints of the channel boundary line in each polygon; and E5. connecting the obtained channel boundary lines in each polygon at the head and the tail, and the obtained path which connects the start point and the terminal point is the channel boundary line of the maze solution.

The invention claimed is:

1. A maze solving method based on a line-surface spatial relation, wherein the method comprises the following steps:
   A. converting a maze picture into vector data by raster to vector conversion, and extracting channel surface-shaped data;
   B. converting the channel surface-shaped data into figures of channel boundary lines, and removing the channel boundary lines at a start point and a terminal point, so that the channels at the start point and the terminal point are open, a channel line start point I and a channel line start point II are formed at the start point, and a channel line terminal point I and a channel line terminal point II are formed at the terminal point;
   C. respectively extending extension lines from the channel line start point I and the channel line start point II of the start point along the two outer sides of the maze, wherein a base point X1 is provided on the extension line of the channel line start point I, and a base point X2 is provided on the extension line of the channel line start point II; respectively extending extension lines from the channel line terminal point I and the channel line terminal point II of the terminal point along the two outer sides of the maze, wherein a base point Y1 is provided on the extension line of the channel line terminal point I, and a base point Y2 is provided on the extension line of the channel line terminal point II; at the outside of the maze, constructing a line which connects the base point X1 and the base point Y1 to obtain a virtual connecting line I from the channel line start point I to the channel line terminal point I, and constructing a line which connects the base point X2 and the base point Y2 to obtain a virtual connecting line II from the channel line start point II to the channel line terminal point II, wherein the virtual connecting line I has no cross point with the extension line of the channel line start point II or the extension line of the channel line terminal point II, and the virtual connecting line II has no cross point with the extension line of the channel line start point I or the extension line of the channel line terminal point I;
   D. constructing a straight line G which passes the start point of the maze and the terminal point of the maze, constructing a virtual connecting line polygon I through the channel boundary lines and the virtual connecting line I, within a range enclosed by the virtual connecting line I and the straight line G;
   constructing a virtual connecting line polygon II through the channel boundary lines and the virtual connecting line II, within a range enclosed by the virtual connecting line II and the straight line G;
   if both of the virtual connecting line polygon I and the virtual connecting line polygon II fail to be constructed, the maze has no solution, and the solving is ended;
   if both of the virtual connecting line polygon I and the virtual connecting line polygon II are successfully constructed, the maze has a solution, and entering step E; and
   E. comparing paths connecting the start point of the maze and the terminal point of the maze in the virtual connecting line polygon I and the virtual connecting line polygon II according to line-surface relation, and selecting the shortest path as the solution of the maze.

2. The maze solving method based on the line-surface spatial relation according to claim 1, wherein:
   the step A comprises the following steps:
   A1. removing color in the maze picture to convert the maze picture into a black and white image;
   A2. performing raster to vector conversion to convert the black and white image into vector data;
   A3. inversely calculating a depth of black and white colors according to a color value;
   A4. figuring out channel portions according to the depth of the black and white color; and
   A5. merging the channel portions to obtain channel surface-shaped data.

3. The maze solving method based on the line-surface spatial relation according to claim 1, wherein the step E comprises the following steps:
   E1. merging the virtual connecting line polygons I to obtain a merged polygon I containing the channel line start point I and the channel line terminal point I; merging the virtual connecting line polygons II to obtain a merged polygon II containing the channel line start point II and the channel line terminal point II;
   E2. if an edge of merged polygon I and an edge of merged polygon II constitute boundaries lines on two sides of a channel, the boundaries lines are channel boundary lines of the solved maze solution, otherwise, entering the next step;
   E3. determining a first channel boundary line having a shorter length in the channel boundary lines of the merged polygon I and merged polygon II, which connects the start point and the terminal point and contains neither the virtual connecting line I nor the virtual connecting line II;
   E4. in each polygon that the determined first channel boundary line passes, judging each polygon to obtain a second channel boundary line having a shorter distance between two endpoints of a part of the determined first channel boundary line located in the polygon, wherein the second channel boundary line contains neither the virtual connecting line I nor the virtual connecting line II; and
   E5. connecting the obtained second channel boundary lines in each polygon at the head and the tail, and the obtained path which connects the start point and the terminal point is the channel boundary line of the maze solution.

* * * * *